US011934579B2

(12) United States Patent
Bokides et al.

(10) Patent No.: US 11,934,579 B2
(45) Date of Patent: Mar. 19, 2024

(54) HAPTIC DEVICE ACTIVATION FOR VIRTUAL EVENTS THAT EXCEED VIEW BOUNDARY

(71) Applicant: Hewlett-Packard Development Company, L.P., Spring, TX (US)

(72) Inventors: Eric Bokides, Fort Collins, CO (US); Tsung-Nung Huang, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 56 days.

(21) Appl. No.: 17/416,704

(22) PCT Filed: May 30, 2019

(86) PCT No.: PCT/US2019/034684
§ 371 (c)(1),
(2) Date: Jun. 21, 2021

(87) PCT Pub. No.: WO2020/242482
PCT Pub. Date: Dec. 3, 2020

(65) Prior Publication Data
US 2022/0075452 A1     Mar. 10, 2022

(51) Int. Cl.
*G06F 3/01* (2006.01)
*G02B 27/00* (2006.01)
*G02B 27/01* (2006.01)

(52) U.S. Cl.
CPC ......... *G06F 3/016* (2013.01); *G02B 27/0093* (2013.01); *G02B 27/0176* (2013.01);
(Continued)

(58) Field of Classification Search
CPC .......... G06F 3/016; G06F 3/012; G06F 3/013; G06F 3/011; G02B 27/0093;
(Continued)

(56) References Cited

U.S. PATENT DOCUMENTS 9,773,391 B1  9/2017 Foshee et al.
9,904,055 B2  2/2018 Burns et al.
(Continued)

FOREIGN PATENT DOCUMENTS

EP      3364272 A1     8/2018
KR   20180044550 A     5/2018
(Continued)

*Primary Examiner* — Phuong H Nguyen
(74) *Attorney, Agent, or Firm* — Quarles & Brady LLP (57) ABSTRACT

An example system includes a strap, a display, a plurality of haptic devices, and a notification engine to cause activation of a haptic device in response to a virtual event that exceeds the view boundary. In an example, instructions may cause a processor to map a relative location of a virtual event to a corresponding location on a strap of an electronic device and cause activation of a haptic device at the corresponding location on the strap in response to a determination that the relative location of the virtual event exceeds a view boundary. In an example method for providing a virtual reality session, a virtual event is determined to correspond to an informational notification, a haptic device is identified to correspond to a location of the virtual event, and activation of the haptic device in an informational notification mode is synchronized with the virtual event.

14 Claims, 5 Drawing Sheets

(52) U.S. Cl.
CPC ......... *G02B 27/0179* (2013.01); *G06F 3/012* (2013.01); *G06F 3/013* (2013.01); *G02B 2027/0178* (2013.01); *G02B 2027/0187* (2013.01)

(58) Field of Classification Search
CPC ............ G02B 27/0176; G02B 27/0179; G02B 2027/0178; G02B 2027/0187; G02B 2027/0161; G02B 2027/0141; G02B 27/017
See application file for complete search history.

(56) References Cited

U.S. PATENT DOCUMENTS

| | | |
|---|---|---|
| 10,198,920 B1* | 2/2019 | Yoneoka ................ G08B 25/08 |
| 10,203,762 B2 | 2/2019 | Bradski et al. |
| 2015/0309316 A1 | 10/2015 | Osterhout et al. |
| 2017/0262045 A1 | 9/2017 | Rouvinez et al. |
| 2017/0309079 A1 | 10/2017 | Naples et al. |
| 2018/0079429 A1* | 3/2018 | Prokhorov ........... H04B 1/3822 |
| 2018/0190027 A1 | 7/2018 | Yao et al. |
| 2019/0005724 A1* | 1/2019 | Pahud .................... G06F 3/011 |
| 2019/0353904 A1* | 11/2019 | Ardovino ............... G06F 3/013 |
| 2019/0387299 A1* | 12/2019 | Evans ................ G06F 3/04815 |

FOREIGN PATENT DOCUMENTS

| | | |
|---|---|---|
| WO | WO-2018103823 A1 | 6/2018 |
| WO | WO-2018154284 A1 | 8/2018 |

* cited by examiner

HAPTIC DEVICE ACTIVATION FOR VIRTUAL EVENTS THAT EXCEED VIEW BOUNDARY

BACKGROUND

Electronic devices designed as a form factor to be worn are increasingly common. Wearable electronic devices are used in many industries including fitness and virtual reality (VR). A user may have an augmented experience of real life with virtual information or a completely virtual experience with immersive displays.

DETAILED DESCRIPTION

In the following description and figures, some example implementations of head-mounted apparatus, head-mounted systems, and/or methods of operating a head-mounted wearable device are described. Electronic devices may include circuitry, a combination of circuitry and executable instructions, a housing to contain the circuitry, and other functional physical parts to accomplish electronic and/or mechanical function. Wearable devices may include such components, including components to allow the device to be worn. For example, wearable devices may include components that provide adjustability or are otherwise adaptable to different body size, body shapes, and/or user preferences. The wearable electronic devices may include components for augmenting an experience, such as a display, ear phones, sensors (such as tactile sensors), and haptic feedback devices. Haptic devices are kinesthetic technology which can create an experience of touch by applying forces, vibrations, and/or motion to a user. Examples of a haptic device include an eccentric rotating mass (ECM) actuator, a linear resonant actuator (LRA), a piezo haptic actuator, a counter-force motor, an air vortex ring, an ultrasound speaker, a tactile electronic display, and the like. As used herein, a haptic device may include a combination of haptic devices.

Virtual reality sessions are designed to be immersive. For example, a head-mounted display (HMD) may include a relatively wide display for each eye and a face gasket to block visual input of real-life beyond the pair of displays. Such immersive experiences may be disorienting and difficult to emulate all real-world circumstances. For example, a user may be unaware of real-world objects around them while in the session. For another example, a user may have little audio or other sensory input to identify objects to the side or behind them. This may be due to the visual reduction of 3D space provided by the HMD when compared to real-life.

Various examples described below relate to using haptic devices to provide informational notifications regarding virtual events that occur outside of a viewable boundary during a virtual reality session. In general, the relative location of a virtual event is identified and, if it is outside of the viewable focus of the user, a haptic device on a strap of the HMD is activated. For example, when a virtual event occurs virtually behind the user, the haptic device may be activated in the back of the strap using a pattern corresponding to an informational notification. In this manner, the HMD system may, for example, provide informational notification of the virtual event in addition to any immersive use of the haptic device.

Figure 1:
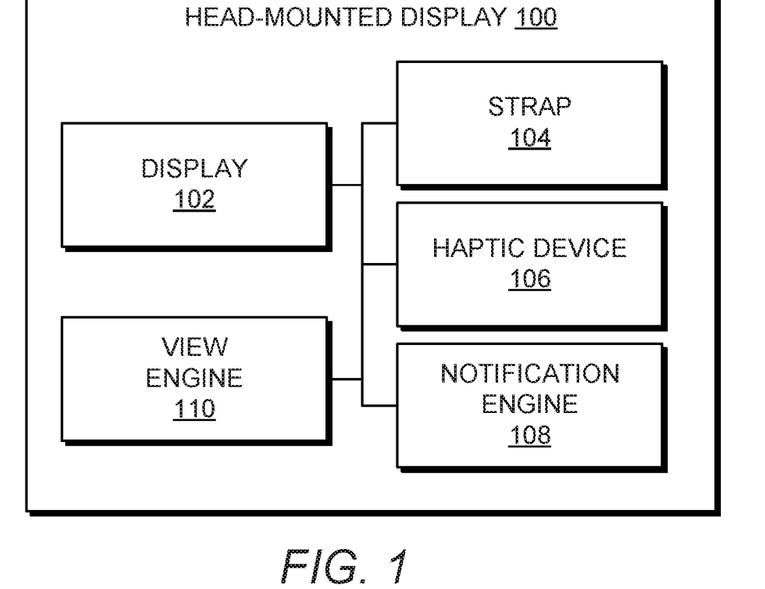
FIG. 1 is a block diagram depicting an example head-mounted display (HMD) system.

FIG. 1 is a block diagram depicting an example head-mounted display (HMD) system 100. The example HMD system 100 of FIG. 1 generally includes a display 102, a strap 104, a haptic device 106, a notification engine 108, and a view engine 110. In general, the notification engine 108 may cause activation of the haptic device 106 on the strap 104 when the notification engine 108 identifies a virtual event that is beyond the view boundary of the display 102 as determined by the view engine 110. As used herein, a virtual event is any event to occur in a virtual environment and is distinct from an event to occur in the real-world.

The display 102 represents any display technology capable of providing visual imagery, such as a liquid crystal display (LCD) or organic light emitting diode (OLEO) display. In some examples, the HMD has multiple screens displaying imagery, such as a display for each eye. The display 102 may include any electronics to perform display of images. For example, the display 102 may include a video controller or graphics processing unit to control video input to be presented on a screen of the display 102. The data provided to the electronics of the display 102 may include image data, as well as other data for a virtual reality session such as audio data, location data, or haptic data. In this manner, the display 102 may include circuitry to assist control of other components connected to the HMD. In some examples, the display 102 includes a port to attach additional sensors or other devices to extend the capabilities of the display 102 and the display controller may coordinate function of those devices as well as the integrated components of the HMD system 100.

The strap 104 represents any physical structure sustainable on a body member of a user, such as the user's head. The strap 104 may be made of plastic, rubber, textile, or a combination thereof to provide comfort, for example. The strap 104 may be adjustable to allow for different head sizes and head shapes. The strap 104 may have components attached to it, including the display 102 and a haptic device 106. The strap 104 may have a circumference that is substantially elliptical and may be adjustable in shape to tighten against a user's head. The display 102 may be mounted at a segment of the strap corresponding to the face of a user. For example, the display 102 is mounted such that the display 102 lays over the eyes of the user when the strap 104 is sustainably tightened around the user's head. The circumference of the strap 104 may be logically designated into different segments, such as a front segment corresponding to a location of a face of a head of a user where the display 102 is located and a back segment corresponding to a non-face area of the head of the user, such as the left side of the head, the right side of the head, or the back side of the head. This is discussed in more detail in the description with respect to FIG. 2.

A haptic device 106 may be embedded or otherwise integrated in the strap. For example, a plastic cover may connect to a textile or rubber band that extends the circumference of the head and within the plastic cover may contain a haptic device or sustain a plurality of haptic devices. The haptic device 106 may be located on an opposing side of the strap 104 with respect to the display 102. In some examples, a plurality of haptic devices 106 extend around the circumference of the strap 104. The haptic devices 106 may be electrically coupled to the electronics of the display 102 or otherwise capable of receiving operational data from a virtual reality host (e.g., a desktop computer communicatively coupled to the HMD system 100). A haptic device 106 may be operable in an information mode to generate physical experiences corresponding to an informational notification and/or an immersive mode to generate physical experiences corresponding to emulating a real-world property of a virtual interaction with virtual objects. For example, the haptic device may vibrate in a first pattern to replicate a texture of a virtual object and vibrate in a second pattern to inform the user that the HMD system 100 is exiting the physical sensor area tracking the HMD system 100 or nearing a physical object to avoid collision. Operation in different modes of the haptic device are discussed in more detail herein with respect to FIGS. 2-7.

An informational notification is any notification to represent information about a virtual object, virtual scenario, etc. that is separate from the virtual reality interactions to be experienced directly. An immersive notification is any notification that represents direct interactions with a virtual object or virtual scene. Therefore, any haptic device operation performed in response to interactions with virtual objects may cause an immersive experience for a user, while a use of a haptic device for informative notifications may cause for an experience beyond the immersion with the virtual environment. For example, an immersive experience of a haptic device may be generating a force or vibration pattern according to a surface texture of a virtual object, whereas an informational experience may provide indication of what type of material the virtual object is representing. For another example, the immersive experience of a haptic device may be generating a force or vibration pattern according to force of an attack by a game character, where as an informational experience may provide an indication of where a game character may be located when not in visual sight (e.g., not within the FOV). Such examples may help with replicating real life experiences, such as the ability to hear someone moving behind the user, or may create new virtual experiences and abilities not offered in real life by human senses, such as the ability to know where a character is located in a building.

The view engine 110 represents any circuitry or combination of circuitry and executable instructions to determine a view boundary of imagery presented on the display 102. For example, the view engine 110 may be a combination of circuitry and executable instructions to determine a view boundary of a virtual environment based on orientation data of the display 102. The orientation data may be provided by a sensor integrated in the HMD system 100, such as in the display 102. Example orientation data may be provided, for example, by a controller coupled to sensors of a gyroscope or accelerometer. In some examples, the view engine 110 receives view boundary data from a separate computer host of the virtual reality session. The computer host may also provide notification data or haptic device operation data to the notification engine 108.

A view boundary, as used herein, represents a visual limitation of imagery presented on the display 102. For example, the imagery displayed on the display 102 may be a subset of the three-dimensional (3D) rendered space capable of being presented to the user. Such presentation capability may be limited by a visual field emulated by the orientation of the user and properties of the display 102, such as the size or resolution of the display 102. This is discussed as a field-of-view (FOV) herein. The FOV may include representations of an angular FOV and/or a linear FOV. For example, the FOV may start at an origin point and extend somewhat conically (e.g. in a frustroconical shape) into the virtual 3D space. The user location in the virtual world (e.g., the device location represented within the virtual world) may be the point where the view originates and extends to the side limitations of the display. The view boundaries may be determined based on the physical limitations of the display 102 as well as by software hosting the virtual session. For example, the view boundary may be a FOV identified using the display orientation and a session view parameter provided by the host software.

The FOV may include multiple boundaries such as a left boundary, right boundary, upward boundary, and a downward boundary in a rectangular presentation of the display and may include a backward boundary and forward boundary in a 3D representation. Other presentation shapes may include related perimeter boundaries, such as displays having a curved geometry, that are limited by the viewable resolution and perception as presented by the virtual session host software. In some examples, the host software may be capable of manipulating the FOV of the 3D space, such as emulating a fish-eye camera or magnification to reduce the space provided but increasing the detail of the area of focus. In another example, the view boundary may be an area-of-focus (AOF), such as a region of the display focused on by the eye as determined by eye-tracking system. The eye-tracking data provided by the eye-tracking system may maintain imagery focused on by the eye as sharp and may adjust the imagery around AOF, by a, as gradually blurry to provide an immersive visual effect. In that example, the view boundary of the AOF may be a portion of the display that remains unblurred or above a sharpness threshold.

The notification engine 108 represents any circuitry or combination of circuitry and executable instructions to cause activation of a haptic device 106 in response to a virtual event that exceeds the view boundary as provided by the view engine 110. For example, the notification engine 108 may be a combination of circuitry and executable instructions that activates a first haptic device 106 of a plurality of haptic devices in response to a virtual event that exceeds the view boundary at a location corresponding to the relative location of the haptic device 106.

The notification engine 108 may include circuitry or a combination of circuitry and executable instructions to identify a relative location of a virtual event with respect the user in virtual space, map the relative location to a haptic actuator location on the strap 104, and activate the located haptic device to provide a notification corresponding to the virtual event. For example, the notification engine 108 may utilize a view boundary provided by the view engine 110 to identify when a virtual event exceeds the view boundary, such as a virtual event that occurs outside the FOV presented on the display 102, and use the relative location as input to a lookup table (LUT) to identify which haptic device on the strap corresponds to the virtual location of the virtual event.

In some examples, functionalities described herein in relation to any of FIGS. 1-7 may be provided in combination with functionalities described herein in relation to any of FIGS. 1-7.

Figure 2:
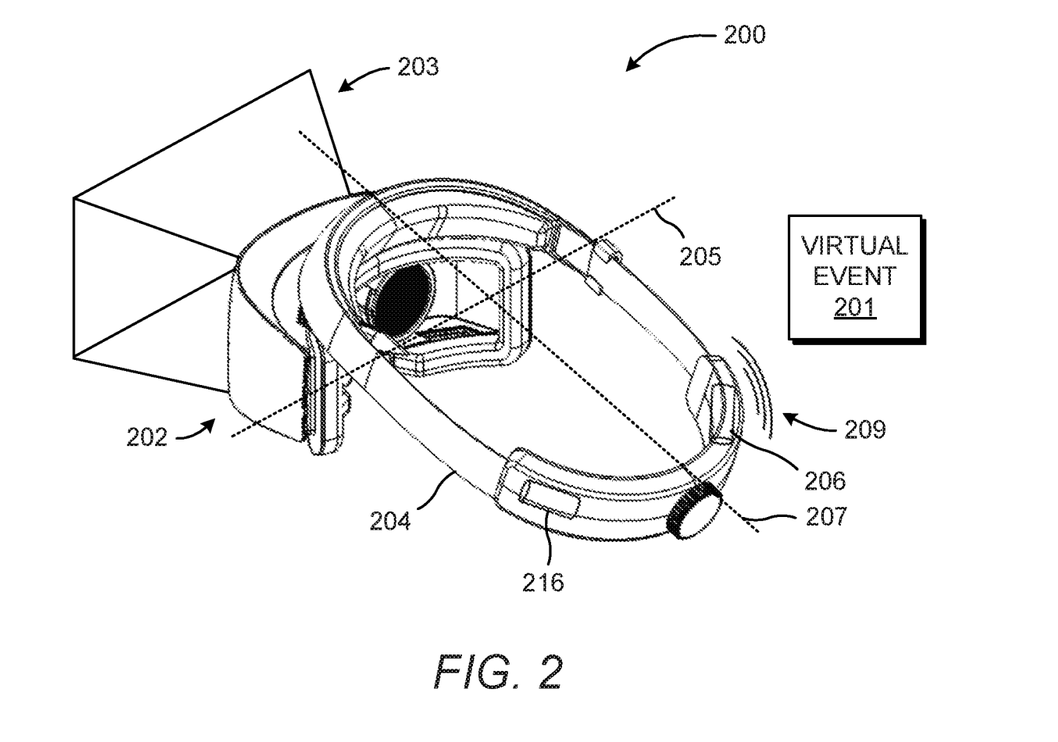
FIG. 2 depicts an example head-mounted wearable device and example representations of virtual elements.

FIG. 2 depicts an example head-mounted wearable device 200 and example representations of virtual elements. The head-mounted wearable device 200 includes a display 202, a strap 204, and haptic devices 206 and 216. The virtual elements include a FOV 203 and a virtual event 201. When a virtual event 201 is identified outside of the FOV 203, the system 200 actuates the haptic device 206, such as vibration 209, to indicate information to the user regarding the virtual event 201 that is occurring behind the user in the virtual space.

The strap 204 may be discussed in segments, visually divided by representational lines 205 and 207. The line 205 is an example location of how the strap 204 may be logically divided into a front segment and a back segment, with the display 202 connected at the front segment of the strap 204 and the haptic devices 206 and 216 connected at the back segment of the strap 204. The line 207 is an example location of how the strap 204 may be logically divided into a left segment and a right segment. In this manner, the strap 204 may be logically separated into multiple segments of the circumference. For example, the strap segment corresponding to the face may be considered the front of the strap, with a left strap side near the left ear, a right strap side near the right ear, and a back side of the strap corresponding to the back of the head. In this manner, the location of the virtual event may be mapped to a related segment of the strap 204 and a haptic device at that location may be activated. For example, if the virtual event 201 relatively occurs behind the user and to the right of the user, the haptic device 206 located on the back-right segment may be activated. In some examples, multiple haptic devices may actuate to produce an informational notification, such as activating both haptic devices 206 and 216 for an event occurring directly behind the user.

In another example, the strap 204 may have a center and the circumference of the strap may be divided by radial degrees, where each degree may be represented in the virtual space conically outwards from the point of origin. For example, from a top view, a 360-degree mapping of virtual event to the zenith of the user's point of view may be mapped to a related location of the 360 degrees of the circumference of the strap 204. In some examples, the haptic devices may be located vertically and horizontally with respect to each other such that different vertical levels may also correspond to vertical height of events in the 3D space. For example, haptic device 206 may be located vertically higher than haptic device 216 and haptic device 206 may be activated for virtual events happening above the user's origin of the point of view.

The haptic device 206 and 216 may be operational in an informational mode and an immersive mode, or the haptic devices may be reserved for informational notification rather than immersive haptic operation. As discussed herein, the operational mode of the haptic device may be associated with a haptic property, such as reserving a haptic vibration pattern to indicate information rather than emulating a virtual experience in the real world (which may be represented by other haptic vibration patterns not reserved for informational notification). The activation of the haptic device 206 in response to the virtual event 201 occurring outside the view boundary causes the haptic device 206 to vibrate with a property corresponding to the information mode, where the property corresponding to the information mode may be a frequency, degree of force, pattern, or combination thereof that is reserved for operation in information mode. In the example of multiple haptic devices at a region of the strap corresponding to the virtual event 201, the haptic devices 206 and 216 may be operated together to generate the unique or otherwise reserved informational haptic pattern. For example, a notification engine, such as notification engine 108 of FIG. 1, may synchronize operation of a first haptic device 206 and a second haptic device 216 to generate a haptic pattern reserved for information notifications, such as switching haptic operation between each device at a particular rate to indicate information (rather than immersion) and avoid confusion with haptic feedback related to immersive effects. Operations of haptic devices in information mode and immersive mode is discussed further herein with respect to FIGS. 3-7.

Figure 3:
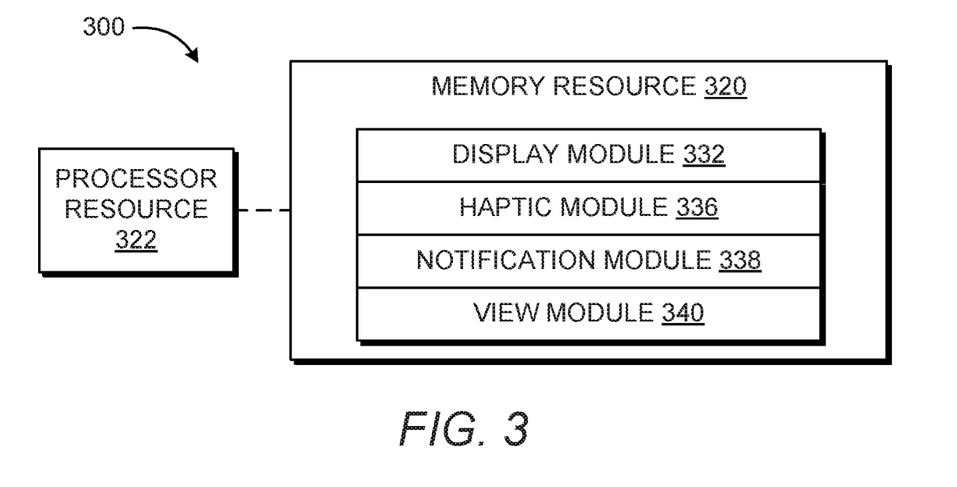
FIG. 3 is a block diagram depicting an example system useable with an HMD.

FIG. 3 is a block diagram depicting an example system usable with an HMD. The example system 300 may comprise a memory resource 320 operatively coupled to a processor resource 322. The memory resource 320 may contain a set of instructions that are executable by the processor resource 322. The set of instructions are operable to cause the processor resource 322 to perform operations of the system 300 when the set of instructions are executed by the processor resource 322. The set of instructions stored on the memory resource 320 may be represented as a display module 332, a haptic module 336, a notification module 338, and a view module 340. The display module 332 represents program instructions that when executed cause function of the display, such as the display 102 of FIG. 1. The haptic module 336 represents program instructions that when executed cause function of a haptic device, such as the haptic device 106 of FIG. 1. The notification module 338 and the view module 340 represent program instructions that when executed cause function of the notification engine 108 and the view engine 110 of FIG. 1, respectively. The processor resource 322 may carry out a set of instructions to execute the modules 332, 336, 338, 340, and/or any other appropriate operations among and/or associated with the modules of the system 300. For example, the processor resource 322 may carry out a set of instructions to determine a location of the virtual event in a virtual environment relative to a device location represented within the virtual environment, map the relative location of the virtual event to a corresponding location on a strap of an electronic device wearable on a head of a user, and cause activation of a haptic device at the corresponding location on the strap in response to a determination that the relative location of the virtual event exceeds a view boundary of a user at the device location. In another example, the processor resource 322 may carry out a set of instructions to identify a region of the head (e.g., a face-oriented region, a back-oriented region, a right-side region, a left-side region, etc.) corresponding to the relative location of the virtual event within the virtual environment, and select a haptic device corresponding to the identified region of the head with informational notification capabilities.

In some examples, the processor resource 322 executes instructions to make calculations or other determinations of thresholds, such as view boundaries. For example, the processor resource 322 may carry out a set of instructions to determine that a virtual event corresponds to an informational notification, determine an orientation of the head of the user, calculate the view boundary based on the orientation of the head of the user and a visual acuity of the user, determine that the virtual event achieves a notification threshold corresponding to an environmental property, and cause actuation of the haptic device in response to the determination that the virtual event achieves a notification threshold corresponding to the environment property and the determination that the location of the virtual event exceeds the view boundary. An environmental property, as used herein, may be any setting corresponding to a property of the virtual environment, such as proximity of the virtual event to the user, a decibel level of the virtual event, the type of virtual event type, etc. The FOV may be calculated using user orientation, display attributes, and software settings, for example. The notification thresholds may be set by a user, such as data stored in a user profile, or by the virtual session hosting software. For example, some users may want informational notifications to be of a certain sensitivity or classification of event, operated a certain force or pattern, turned on for particular positions (e.g., directly overhead), and/or turned on at certain times of the day.

In some examples, the processor resource 322 executes instructions to cause the haptic device to operate in a particular manner. For example, the processor resource 322 may carry out a set of instructions to identify an information classification of the virtual event (e.g., what type of information is to be notified corresponding to that virtual event), determine a haptic pattern corresponding to the information classification (e.g., such as by using a LUT), and cause the haptic device to operate in the haptic pattern corresponding to the information classification. In another example, the processor resource 322 may carry out a set of instructions to identify a texture corresponding to an information classification, identify a combination of haptic actuators, and cause the combination of haptic actuators to operate in a pattern to emulate a texture reserved for information notification corresponding to the information classification. In this manner, the processor resource 322 may carry out a set of instructions stored on memory resource 320 to operate the system 300 to provide informational notifications via a haptic feedback device at a non-face-oriented region of the strap of a head-mounted wearable device.

Figure 4:
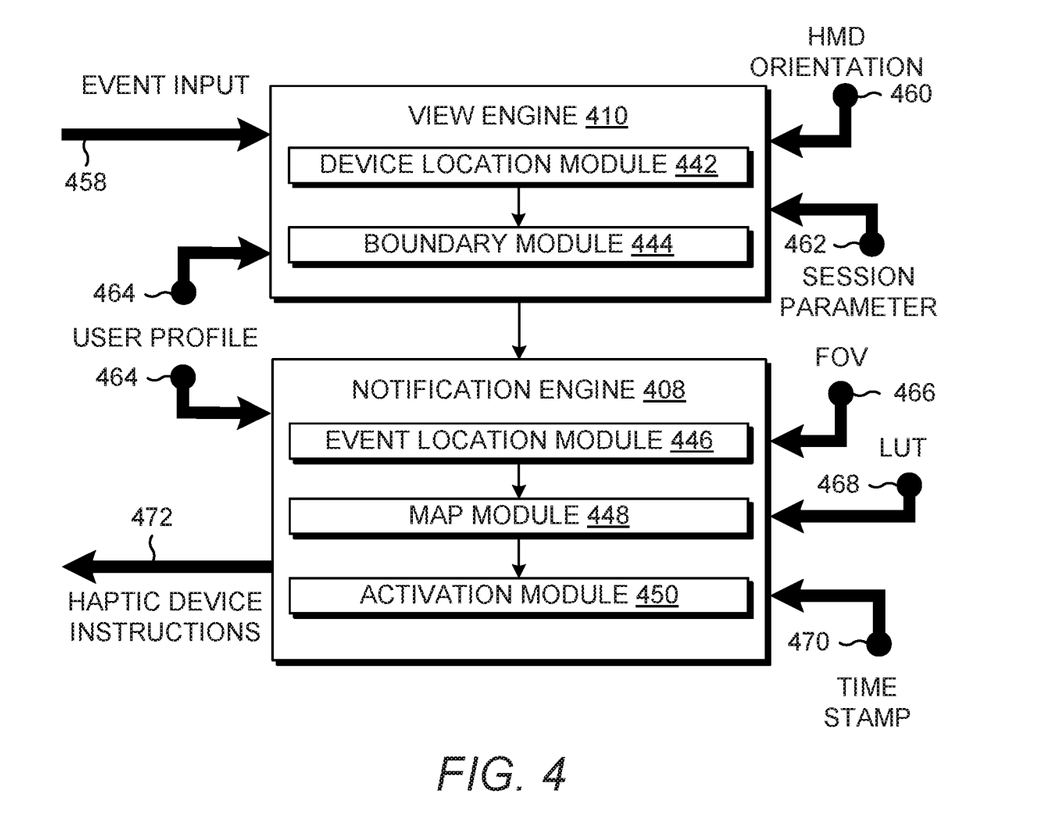
FIG. 4 depicts example components used to implement example HMD systems.

Although these particular modules and various other modules are illustrated and discussed in relation to FIG. 3 and other example implementations, other combinations or sub-combinations of modules may be included within other implementations. Said differently, although the modules illustrated in FIG. 3 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 4 depicts yet another example of how functionality may be organized into modules.

A processor resource is any appropriate circuitry capable of processing (e.g., computing) instructions, such as one or multiple processing elements capable of retrieving instructions from a memory resource and executing those instructions. For example, the processor resource 322 may be a central processing unit (CPU) that enables operating a haptic device in accordance with information of virtual events by fetching, decoding, and executing modules 332, 336, 338, and 340. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system 300. The medium is any non-transitory medium or combination of non-transitory media able to electronically store data, such as modules of the system 300 and/or data used by the system 300. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the system 300 of FIG. 3. A memory resource may be integrated in the same device as a processor resource or it may be separate but accessible to that device and the processor resource. A memory resource may be distributed across devices.

In the discussion herein, the engines 108 and 110 of FIG. 1 and the modules 332, 336, 338, and 340 of FIG. 3 have been described as circuitry or a combination of circuitry and executable instructions. Such components may be implemented in a number of fashions. Looking at FIG. 3, the executable instructions may be processor-executable instructions, such as program instructions, stored on the memory resource 320, which is a tangible, non-transitory computer-readable storage medium, and the circuitry may be electronic circuitry, such as processor resource 322, for executing those instructions. The instructions residing on a memory resource may comprise any set of instructions to be executed directly (such as machine code) or indirectly (such as a script) by a processor resource.

In some examples, the system 300 may include the executable instructions may be part of an installation package that when installed may be executed by a processor resource to perform operations of the system 300, such as methods described with regards to FIGS. 4-7. In that example, a memory resource may be a portable medium such as a compact disc, a digital video disc, a flash drive, or memory maintained by a computer device, such as a data server or cloud service, from which the installation package may be downloaded and installed. In another example, the executable instructions may be part of an application or applications already installed. A memory resource may be a non-volatile memory resource such as read-only memory (ROM), a volatile memory resource such as random-access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid-state drive (SSD), or an optical drive.

Referring to FIGS. 1-3, the engines 108 and 110 of FIG. 1 and/or the modules 332, 336, 338, 340 may be distributed across devices (such as the HMD system or a host computing device), services (e.g., virtual software executing on a cloud service), or a combination thereof. The engine and/or modules may complete or assist completion of operations performed in describing another engine and/or module. For example, the view engine 110 of FIG. 1 may request, complete, or perform the methods or operations described with the view module 340 of FIG. 3 as well as the display module 332, the haptic module 336, and the notification module 338 of FIG. 3. Thus, although the various engines and modules are shown as separate engines in FIGS. 1 and 3, in other implementations, the functionality of multiple engines and/or modules may be implemented as a single engine and/or module or divided in a variety of engines and/or modules. In some example, the engines of the system 100 may perform example methods described in connection with FIGS. 4-7.

FIG. 4 depicts example components used to implement example HMD systems, such as HMD system 100 of FIG. 1. Referring to FIG. 4, the example components of FIG. 4 generally include a view engine 410 and a notification engine 408. The example components of FIG. 4 may be implemented on a compute device, such as a stand-alone HMD device or a desktop host.

Event input 458 is received by the view engine 410. The view engine 410 includes program instructions, such as a device location module 442 and a boundary module 444 to assist identification of a view boundary. The location module 442 represents program instructions that when executed cause a processor resource to identify a location of the device (and/or user) as represented in the virtual world. The boundary module 444 represents program instructions that when executed cause a processor resource to calculate a view boundary. The view engine 410 may utilize HMD orientation data 460 when executing the boundary module 444 to determine the point of origin and direction of view. The view engine 410 may utilize a session parameter 462 and/or a user profile 464 to determine whether all or a portion of the imagery presented on a display is considered within the view boundary. For example, the user may be able to set a resolution of the display and the virtual reality session host software may set a camera lens type to emulate.

The notification engine 408 includes program instructions (such as an event location module 446, a map module 448, and an activation module 450) to assist generation of haptic device instructions 472 to operate a haptic device in information mode. The event location module 446 represents program instructions that when executed cause a processor resource to identify a relative virtual event location with respect to the view boundaries (e.g., FOV 466) identified by the view engine 410. The map module 448 represents program instructions that when executed cause a processor resource to identify the type of informational notification corresponding to the virtual event and map a relative virtual event location to a location on a strap of a wearable device. For example, the notification engine 408 may execute the map module 448 to cause a processor resource 448 to retrieve a notification classification from the LUT 468 using the virtual event type and retrieve a strap segment or haptic actuator location corresponding to a relative virtual event location (e.g., proximity and directional information with respect to the orientation of the view) in the LUT 468 (or a separate LUT). The activation module 450 represents program instructions that when executed cause a processor resource to cause synchronization of operation of the haptic device with the virtual event and modify the notification in accordance with the user's preferences based on the settings in the user profile 464. For example, a time stamp 470 may be presented with the request to operate the haptic device or the haptic device instructions may be delayed until the time of the time stamp 470 arrives. By utilizing the modules of FIG. 4, a haptic device is coordinated to provide an informational notification in accordance with the virtual event and the users preferences.

Figure 5:
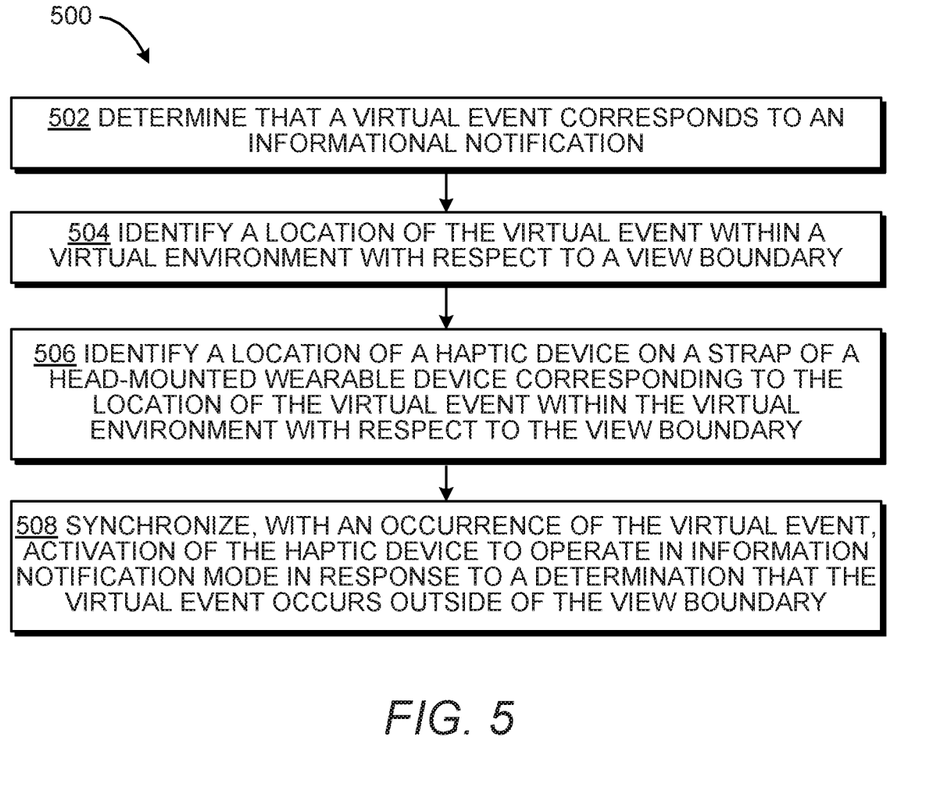
FIGS. 5-7 are flow diagrams depicting example methods for providing a virtual reality session with a head-mounted wearable device.
Figure 6:
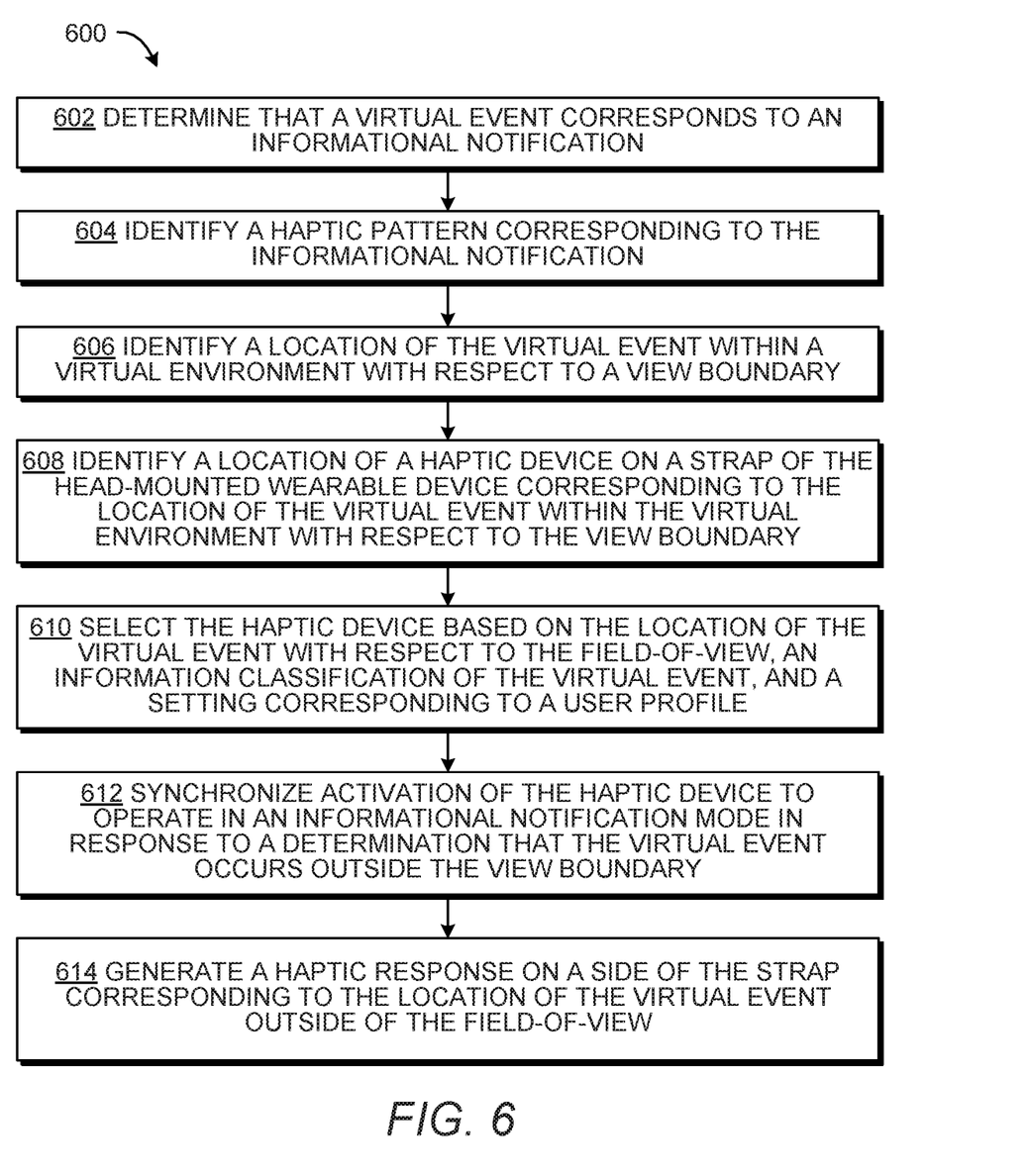
Figure 7:
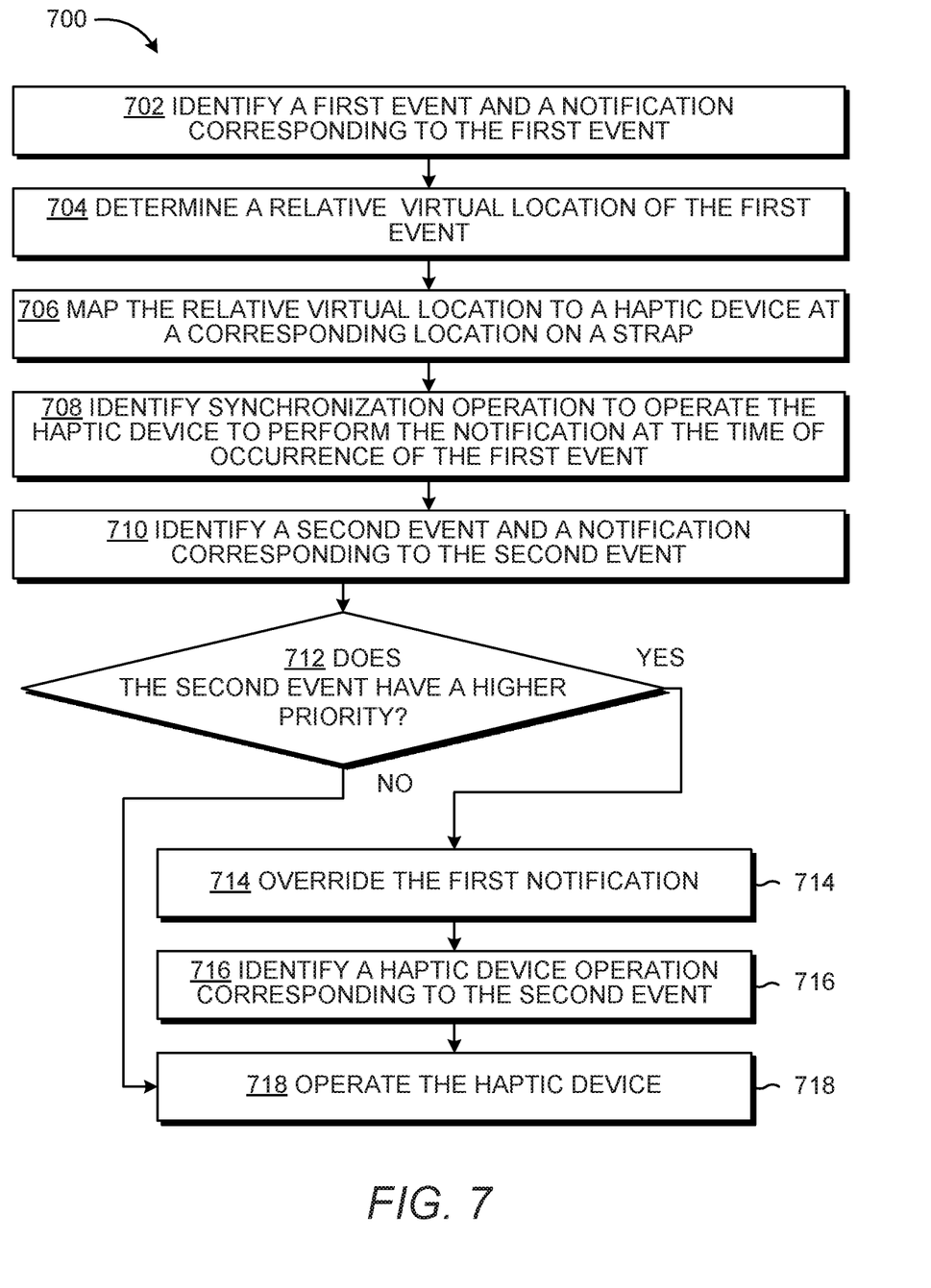

FIGS. 5-7 are flow diagrams depicting example methods for providing a virtual reality session with a head-mounted wearable device. Referring to FIG. 5, example method 500 for providing a virtual reality session may generally comprise identifying a location of a virtual event, identifying a location of a haptic device on a strap of a head-mounted wearable device, and synchronizing activation of the haptic device with an occurrence of the virtual event to provide an informational notification. The methods 500-700 of FIGS. 5-7 are performable by circuitry or a combination of circuitry and executable instructions, such as system 100 of FIG. 1 via the notification engine 10 and the view engine 110.

At block 502, a virtual event is determined to correspond to an informational notification. For example, the virtual event may be proximity-based where the type of indication may be notification that a virtual object of a particular type is within a distance range from the user's virtual avatar. For another example, the virtual event may be the approaching direction of a virtual object towards the point of origin of the view of the virtual session and an approaching signal notification may be identified to correspond with the virtual event.

At block 504, a location of the virtual event within a virtual environment is identified with respect to a view boundary. For example, if the location of the virtual event within the virtual environment is within the FOV, an informational notification may be disregarded, where if the location of the virtual event is outside the FOV, the informational notification is generated via blocks 506 and 508.

At block 506, a location of a haptic device on a strap of a head-mounted wearable device is identified. The location is identified as corresponding to the location of the virtual event within the virtual environment with respect to the view boundary. For example, the circumference of the strap of a wearable device may be divided into a number of segments corresponding to the number of haptic devices integrated in the strap and a segment may be identified that corresponds to the relative location of the virtual event within the virtual environment with respect to vector of the FOV from the origin point.

At block 508, the activation of the haptic device to operate in informational notification mode is synchronized with an occurrence of the virtual event. For example, the identification of the virtual event may be determined dynamically, and the activation of the haptic device may be synchronized with the occurrence of the virtual event in response to a determination that the virtual event as it occurs outside of the FOV.

FIG. 6 depicts a method 600 that includes blocks similar to blocks of the method 500 of FIG. 5 and provides additional blocks and details. In particular, FIG. 6 depicts additional blocks and details generally regarding identifying a haptic pattern, selecting a haptic device, and generating a haptic response. Blocks 602, 606, 608, and 612 are similar to blocks 502, 504, 506, and 508 of FIG. 5 and, for brevity, their respective descriptions are not repeated in their entirety.

At block 602, a virtual event is determined to correspond to an informational notification. At block 604, a haptic pattern corresponding to the informational notification is identified, such as by looking up the type of informational notification in a LUT.

At block 606, the location of the virtual event is identified relative to the view boundary (e.g., the display limitations and the view direction). At block 608, a location of a haptic device on a head-mounted wearable device strap is identified that corresponds to the location of the virtual event with respect to the view boundary. At block 610, a haptic device is selected based on the location of the virtual event with respect to the view boundary and any other appropriate parameters. For example, a processor controller may execute instructions to select the haptic device based on the location of the virtual event with respect to the FOV, an information classification of the virtual event (e.g., as identified at block 602 or 604), and a setting corresponding to a user profile (e.g., such as sensitivity or desire to receive informational notifications).

At block 612, activation of the haptic device is synchronized to operate in an informational notification mode in response to a determination that the virtual event occurs outside the view boundary. For example, a haptic device at the relative location is set to operate at the haptic pattern identified at block 604 in response to the virtual event occurring outside the FOV and instructed to actuate at the same time as the time stamp of the virtual event. At block 614, a haptic response is generated using the haptic pattern by operating the haptic device that represents the relative location of the virtual event. For example, a haptic response indicating an approaching virtual object is generated on a side of the strap corresponding to the location of the virtual event outside of the FOV in response to a virtual element approaching an origin point of the FOV.

FIG. 7 is a flow diagram depicting an example method 700 for operating a haptic device coupled to a head-mounted wearable device. In particular, method 700 includes additional blocks depicting coordination of activating haptic devices during the occurrence of multiple virtual events.

At block 702, a first virtual event is identified and a notification type corresponding to the first virtual event is identified. At block 704, a relative virtual location of the first event is determined with respect to a view boundary. At block 706, the relative virtual location is mapped to a haptic device at a corresponding location on a strap of a wearable device. At block 708, a synchronization operation is identified to cause the notification to be performed at the time of occurrence of the first event. For example, a processing operation to determine when to initiate the haptic device, such as to coincide with the corresponding virtual event. In some examples, this may be dynamically performed and other examples, the operation may be proposed and determined prior to the virtual event, such as in the event of linear gameplay and the occurrence of known time-based triggered events.

At block 710, a second virtual event is identified and a notification type corresponding to the second virtual event is identified. At block 712, a determination is made as to whether the priority of the notification type of the second event is higher than the priority corresponding to the notification type of the first event. If the first event has a higher priority than the second event, then the haptic device is operated with the notification type corresponding to the first event at block 718. If the second event has a higher priority than the first event, then an override operation is performed at block 714 and a haptic device operation corresponding to the second event is identified at block 716. For example, the second event may be an immersive event corresponding to an immersion classification that is higher priority than the information notification classification of the first event and an overriding operation to synchronize the second event haptic action is performed with the second event (rather than preparing to perform the first event haptic action with the first event). In that example, an override operation is performed to generate a haptic pattern corresponding to an informational notification when a second virtual event occurs corresponding to a priority immersion classification.

In some cases, the haptic device operation performed for the first event may be interrupted to cause operation of the haptic device for the second event. Thus, when a second event overrides a first event, the haptic device is caused to operate in a haptic pattern corresponding to the priority immersion classification in response to the second virtual event occurring outside the FOV at block 718, for example.

In some examples, the first and second event may be switched, such as where informational notifications have a higher priority over immersive operations of the haptic device. In yet other examples, the first or second event may be a real event, such as providing a higher priority to haptic device operation indicating proximity to a real-world object to avoid unintended contact and potential injury over a lower priority informational notification of a virtual event.

Although the flow diagrams of FIGS. 4-7 illustrate specific orders of execution, the execution order may differ from that which is illustrated. For example, the execution order of blocks may be scrambled relative to the order shown. Also, the blocks shown in succession may be executed concurrently or with partial concurrence. All such variations are within the scope of the present description.

All the features disclosed in this specification (including any accompanying claims, abstract and drawings), and/or all the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature described as based on some stimulus may be based only on the stimulus or a combination of stimuli including the stimulus. Furthermore, use of the words "first," "second," or related terms in the claims are not used to limit the claim elements to an order or location, but are merely used to distinguish separate claim elements.

The present description has been shown and described with reference to the foregoing examples. It is understood that other forms, details, and examples may be made without departing from the spirit and scope of the following claims.

What is claimed is:

1. A head-mounted display (HMD) system comprising:
 a strap, the strap having a circumference;
 a display mounted to the strap at a first segment of the circumference, the first segment corresponding to a location of a face of a head of a user;
 a plurality of haptic devices coupled to the strap at a second segment of the circumference, the second segment corresponding to a non-face area of the head of the user;
 a view engine to determine a view boundary of a virtual environment based on orientation data of the display; and
 a notification engine to cause activation of a first haptic device of the plurality of haptic devices in response to a virtual event that exceeds the view boundary,
 wherein the first haptic device is operable in an information mode and an immersive mode, and the activation of the first haptic device in response to the virtual event occurring outside the view boundary causes the first haptic device to vibrate with a property reserved for the information mode, wherein the different properties are reserved for the immersive mode.

2. The HMD system of claim 1, wherein:
the plurality of haptic devices are integrated in the strap; and
the notification engine is to:
identify a relative location of the virtual event with respect to the user;
map the relative location to a haptic device location on the strap; and
activate the first haptic device at the haptic device location.

3. The HMD system of claim 1, wherein:
the view boundary is determined based on:
a field-of-view identified using the orientation data and a session view parameter; or
an area-of-focus determined by eye-tracking data.

4. The HMD system of claim 1, wherein:
the property corresponding to the information mode is a frequency, degree of force, pattern, or combination thereof that is reserved for operation in the information mode.

5. The HMD system of claim 1, wherein:
the first haptic device and a second haptic device are located in a region of the second segment of the strap corresponding to a relative location of the virtual event with respect to the user; and
the notification engine is to synchronize operation of the first haptic device and the second haptic device to generate a haptic pattern reserved for informational notifications.

6. A non-transitory computer-readable storage medium (NTCRSM) comprising a set of instructions executable by a processor resource to:
determine a location of a virtual event in a virtual environment relative to a device location represented within the virtual environment;
map a relative location of the virtual event to a corresponding location on a strap of an electronic device wearable on a head of a user; and
cause activation of a haptic device at the corresponding location on the strap in response to a determination that the relative location of the virtual event exceeds a view boundary of the user at the device location,
wherein the haptic device is operable in an information mode and an immersive mode, and causing the activation of the haptic device in response to the determination includes causing the haptic device to vibrate with a property to reserved for the information mode, wherein different properties are reserved for the immersive mode.

7. The NTCRSM of claim 6, wherein the set of instructions is executable by the processor resource to:
determine an orientation of the head of the user;
calculate the view boundary based on the orientation of the head of the user and a visual acuity of the user; and
determine that the virtual event achieves a notification threshold corresponding to an environmental property, wherein the activation of the haptic device is caused in response to the determination that the virtual event achieves the notification threshold corresponding to the environmental property and the determination that the location of the virtual event exceeds the view boundary.

8. The NTCRSM of claim 6, wherein the set of instructions is executable by the processor resource to cause the haptic device to vibrate with a property corresponding to the information mode by:
identifying an information classification of the virtual event; and
determining a haptic pattern corresponding to the information classification,
wherein the haptic device is actuated to operate in the haptic pattern corresponding to the information classification.

9. The NTCRSM of claim 8, wherein the haptic device is a combination of haptic actuators and the set of instructions is executable by the processor resource to:
cause the combination of haptic actuators to operate in a pattern to emulate a texture reserved for information notification corresponding to the information classification.

10. The NTCRSM of claim 6, wherein the set of instructions is executable by the processor resource to:
identify a region of the head corresponding to the relative location of the virtual event within the virtual environment, the region of the head segmented into regions including a face-oriented segment, a back-oriented segment, a right-side segment, and a left-side segment; and
select the haptic device corresponding to identified region of the head in the back-oriented segment, the right-side segment, or the left-side segment.

11. A method for providing a virtual reality session with a head-mounted wearable device, the method comprising:
determining that a virtual event corresponds to an informational notification;
identifying a location of the virtual event within a virtual environment with respect to a field-of-view;
identifying a location of a haptic device on a strap of the head-mounted wearable device corresponding to the location of the virtual event within the virtual environment with respect to the field-of-view; and
synchronizing, with an occurrence of the virtual event, activation of the haptic device to operate in informational notification mode in response to a determination that the virtual event occurs outside of the field-of-view,
wherein the haptic device is operable in the informational notification mode and an immersive mode, and the activation of the haptic device in response to the determination causes the haptic device to vibrate with a property reserved for the informational notification mode, wherein different properties are reserved for the immersive mode.

12. The method of claim 11, comprising:
selecting the haptic device based on the location of the virtual event with respect to the field-of-view, an information classification of the virtual event, and a setting corresponding to a user profile; and
generating a haptic response on a side of the strap corresponding to the location of the virtual event outside of the field-of-view in response to a virtual element approaching an origin point of the field-of-view.

13. The method of claim 11, wherein causing the haptic device to vibrate with a property reserved for the informational notification mode comprises:
identifying a haptic pattern corresponding to an informational notification; and
setting the haptic device to operate at the identified haptic pattern in response to the virtual event occurring outside the field-of-view.

14. The method of claim 11, comprising:
overriding operation of the haptic device to generate a haptic pattern corresponding to an informational notification when a second virtual event occurs corresponding to a priority immersion classification; and causing the haptic device to operate in a haptic pattern corresponding to the priority immersion classification in response to the second virtual event occurring outside the field-of-view.

\* \* \* \* \*